(12) United States Patent
Kaitoh et al.

(10) Patent No.: US 6,741,379 B2
(45) Date of Patent: May 25, 2004

(54) OPTICAL MODULE HAVING ELEMENT FOR OPTICAL PHASE SHIFT USING ELECTRO-OPTIC EFFECT

(75) Inventors: Yoshihiko Kaitoh, Sapporo (JP); Tetsuo Ishizaka, Kawasaki (JP); Takehito Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/200,758

(22) Filed: Jul. 24, 2002

(65) Prior Publication Data
US 2003/0151792 A1 Aug. 14, 2003

(30) Foreign Application Priority Data
Feb. 8, 2002 (JP) ........................................ 2002-033079

(51) Int. Cl.[7] ............................. G02F 1/01; G02F 1/035
(52) U.S. Cl. ..................... 359/279; 359/245; 359/254; 385/2; 385/8; 385/39
(58) Field of Search ........................ 359/245, 254, 359/248, 238, 279, 322; 385/1–4, 8, 9, 14–16, 24, 27, 31, 39, 40, 41, 130–132

(56) References Cited

U.S. PATENT DOCUMENTS 5,991,491 A * 11/1999 Madabhushi ................ 385/131
6,192,167 B1 * 2/2001 Kissa et al. .................... 385/3
6,429,959 B1 * 8/2002 Gopalakrishnan et al. .. 359/254

FOREIGN PATENT DOCUMENTS

| EP | 1 126 542 A1 | 8/2001 |
| JP | 9-23108 | 1/1997 |
| JP | 10-123472 | 5/1998 |
| JP | 10-213783 | 8/1998 |
| JP | 63-316901 | 12/1998 |
| JP | 2000-131658 | 5/2000 |
| JP | 2001-230606 | 8/2001 |

* cited by examiner

*Primary Examiner*—Hung Xuan Dang
*Assistant Examiner*—Tuyen Tra
(74) *Attorney, Agent, or Firm*—Staas & Halsey LLP

(57) ABSTRACT

The optical module has an element mounted thereupon for shifting an optical phase by the electro-optic effect, and includes an element for shifting an optical phase by an electro-optic effect having a signal electrode and a ground electrode formed thereupon; a connector for supplying a control signal of a microwave region to the signal electrode of the element, having a center conductor and an outer conductor; and a repeating board formed on a dielectric wafer having a coplanar line connecting the signal electrode and the ground electrode with the center conductor and the outer conductor of the connector respectively on the dielectric wafer, wherein an air layer is formed on the lower portion of the repeating board on which the center conductor of the connector is disposed.

22 Claims, 12 Drawing Sheets

OPTICAL MODULE HAVING ELEMENT FOR OPTICAL PHASE SHIFT USING ELECTRO-OPTIC EFFECT

FIELD OF THE INVENTION

The present invention relates to an optical module having an element mounted thereon for shifting an optical phase using the electro-optic effect.

BACKGROUND OF THE INVENTION

Optical communication systems have been introduced to implement large-capacity broadband communication systems. As demands for expanding communication capacity increase, higher bit rate is desired in such optical communication systems.

Meanwhile, in optical communication systems, there has been employed an optical module as an optical modulator, a beam polarizer and an electric shutter, on which an element capable of shifting an optical phase by the electro-optic effect is mounted. Here, the electro-optic effect is a known effect by which a refractive index of a ferroelectric crystal or the like is varied when electric field is applied thereupon.

The element for shifting an optical phase by the electro-optic effect (hereinafter simply referred to as electro-optic effect element) mounted on such an optical module includes an optical waveguide. The optical waveguide is formed by patterning a metal film of Ti, etc. on a wafer being cut from an electro-optic crystal formed of $LiNbO_3$, $LiTaO_2$, etc. and then by thermal-diffusing or by proton-exchanging in benzoic acid for use in IC manufacturing process. Also, necessary electrodes are produced near the optical waveguide.

The optical module is configured with an optical signal supplied from outside the electro-optic effect element to the optical waveguide and a high frequency control signal of microwave band being supplied to the electrodes produced near the optical waveguide.

FIG. 1 shows a top plan view of a configuration example of the optical module for use in an optical modulator in an uncovered state. An electro-optic effect element 2 is accommodated in a shielding case 1. FIG. 2 shows a schematic configuration diagram of electro-optic effect element 2.

To function as an optical modulator, an optical waveguide 10 formed on electro-optic effect element 2 schematically illustrated in FIGS. 2A to 2C is, as one example, split into a pair of branching waveguides disposed in parallel to form a Mach-Zehnder waveguide. FIG. 2B is a cross-sectional view along line 'a' in the plan view shown in FIG. 2A, while FIG. 2C is a cross-sectional view along line 'b'.

In an exemplary configuration in which a single electrode is employed in the intensity modulation scheme using a Z-cut wafer which is produced by cutting a wafer of electro-optic effect element 2 in Z-axis direction of $LiNbO_3$ crystal, a signal electrode 20' is disposed right on one branching waveguide out of the aforementioned parallel waveguides, while a ground electrode 22 is disposed right on the other branching waveguide. Further, a buffer layer formed of $SiO_2$ is provided between the wafer and signal electrode 20 and between the wafer and ground electrode 22, so that an optical signal transmitted in the parallel waveguides is not absorbed in signal electrode 20 and ground electrode 22.

In FIG. 2A, an optical signal is input into the incident side of waveguide 10 (Opt In). To function as an optical modulator, a microwave signal being output from a signal source 25 is supplied to signal electrode 20 as a modulation signal in the same direction as the above-mentioned optical signal transmission direction. Accordingly, a refraction index of the branching parallel optical waveguide varies in mutually opposite direction corresponding to the polarity of the microwave signal. This produces an optical phase difference in each parallel optical waveguide, to output an optical signal being intensity-modulated from an output side (Opt Out) of optical waveguide 10 shown in FIG. 2A.

Here, in the optical module configuration shown in FIG. 1, a high frequency signal i.e. a microwave modulation signal fed from signal source 25 is supplied between signal electrode 20 and ground electrodes 21, 22 through an RF connector 3 consisting of a center conductor 30 and an outer conductor 31.

At this time, in the conventional configuration shown in FIG. 1, center conductor 30 of RF connector 3 is inserted into a sliding contact member 32 to connect with signal electrode 20 of electro-optic effect element 2 by bonding. Also, in this conventional configuration, outer conductor 31 of RF connector 3 is connected to ground electrodes 21, 22 of electro-optic effect element 2 through a bonding wire 23.

However, a sufficient space for inserting a bonding tool was required for this bonding. For this reason, it was inevitable to protrude center conductor 30 of RF connector 3 from the coaxial condition of RF connector 3. This causes increased characteristic impedance in the protrusion portion of center conductor 30 in RF connector 3, resulting in producing impedance mismatch.

Further, though the characteristic is not influenced so much when the wavelength of a high frequency signal is long as compared to the size of the electrode in electro-optic effect element 2, the high frequency characteristic of electro-optic effect element 2 is substantially influenced when the high frequency signal wavelength becomes shorter. As a result radiation and reflection are produced in the high frequency signal, and a wideband transmission characteristic in electro-optic effect element 2 becomes impeded. Also, the sizes of slide contact member 32 and center conductor 30 of RF connector 3 are as minute as several tens $\mu$m. Therefore, efficiency in assembly work is significantly bad.

To cope with these problems, the inventors of the present invention have been studying of adopting a method of using an intermediate or repeating board (hereinafter, called as repeating board). However, in the connection between RF connector 3 and electro-optic effect element 2 through the repeating board, even when designing a characteristic impedance to be, for example, 50 $\Omega$ in each portion itself, it is inevitable to have an abrupt impedance variation in the connection of RF connector 3 and the repeating board. As a result, still there has been a problem of an increased transmission loss.

SUMMARY OF THE INVENTION

Accordingly, in an optical module on which an element for shifting an optical phase by the electro-optic effect is mounted, it is an object of the present invention to provide a preferable configuration of the optical module to circumvent a loss produced when a high frequency control signal is externally supplied through an RF connector.

According to the present invention to solve the aforementioned problem, as a first embodiment of the optical module having an element for shifting an optical phase by the electro-optic effect, the optical module includes; the element for shifting an optical phase by the electro-optic effect having a signal electrode and a ground electrode formed thereupon; a connector for supplying a control signal of a microwave region to the signal electrode of the element, having a center conductor and an outer conductor; and a repeating board formed on a dielectric wafer having the signal electrode and the ground electrode of the element and a coplanar line for connecting the center conductor of the connector with the outer conductor respectively formed on the dielectric wafer. Here, an air layer is formed on the lower portion of the repeating board on which the center conductor of the connector is disposed.

As a second embodiment of the optical module to solve the aforementioned problem, in the first embodiment, the air layer is formed on the lower portion of the repeating board on which the center conductor of the connector is disposed is formed by a notch produced on the side face of the dielectric wafer positioned oppositely to the connector.

As a third embodiment of the optical module to solve the aforementioned problem, in the second embodiment, the coplanar line is constituted by a signal electrode and ground electrodes disposed on both sides of the signal electrode. The interval between the ground electrodes is smaller than the diameter of the outer conductor of the connector.

As a fourth embodiment of the optical module to solve the aforementioned problem, the optical module includes; the element for shifting an optical phase produced by the electro-optic effect, having a signal electrode and a ground electrode formed thereupon; a connector for supplying a control signal of a microwave region to the signal electrode of the element, having a center conductor and an outer conductor; and a repeating board formed on a dielectric wafer having the signal electrode and the ground electrode of the element and a coplanar line for connecting the center conductor of the connector with the outer conductor respectively formed on the dielectric wafer. The outer conductor of the connector has an extended diameter in the area positioned oppositely to the repeating board.

As a fifth embodiment of the optical module to solve the aforementioned problem, the optical module includes; the element for shifting an optical phase by the electro-optic effect having a signal electrode and a ground electrode formed thereupon; a connector for supplying a control signal of a microwave region to the signal electrode of the element, having a center conductor and an outer conductor; and a repeating board formed on a dielectric wafer having the signal electrode and the ground electrode of the element and a coplanar line for connecting the center conductor of the connector with the outer conductor respectively formed on the dielectric wafer. Here, the lower portion of the repeating board on which the center conductor of the connector is disposed is chamfered in a taper shape to form an air layer.

As a sixth embodiment of the optical module to solve the aforementioned problem, in the fourth or fifth embodiment, the coplanar line is constituted by a signal electrode and ground electrodes disposed between both sides of the signal electrode. The interval between the ground electrodes is larger than the diameter of the outer conductor of the connector.

As a seventh embodiment of the optical module to solve the aforementioned problem, the optical module includes; the element for shifting an optical phase by the electro-optic effect having a signal electrode and a ground electrode formed thereupon; a connector for supplying a control signal of a microwave region to the signal electrode of the element, having a center conductor and an outer conductor; a repeating board formed on a dielectric wafer having the signal electrode and the ground electrode of the element and a coplanar line for connecting the center conductor of the connector with the outer conductor respectively formed on the dielectric wafer; and a metal body for mounting the dielectric wafer for the repeating board. Here, an air layer is formed on the metal body portion corresponding to the lower portion of the repeating board on which the center conductor of the connector is disposed.

As an eighth embodiment of the optical module to solve the aforementioned problem, the optical module includes; the element for shifting an optical phase by the electro-optic effect having a signal electrode and a ground electrode formed thereupon; a connector for supplying a control signal of a microwave region to the signal electrode of the element, having a center conductor and an outer conductor; a repeating board formed on a dielectric wafer having the signal electrode and the ground electrode of the element and a coplanar line for connecting the center conductor of the connector with the outer conductor respectively formed on the dielectric wafer; and a metal body for mounting the repeating board formed on the dielectric wafer. Here, the dielectric wafer for the repeating board is electrically connected to the metal body through a plurality of VIA.

As a ninth embodiment of the optical module to solve the aforementioned problem, in the eighth embodiment, the dielectric wafer is constituted of multi-layer structure having an internal conductor in the middle layer to connect the plurality of VIA by the internal conductor.

As a tenth embodiment of the optical module to solve the aforementioned problem, among the plurality of VIA in the ninth embodiment, a VIA of the repeating board positioned in the area in which the center conductor of the connector is disposed is not connected to the internal conductor.

As an eleventh embodiment of the optical module to solve the aforementioned problem, in the first, fourth or fifth embodiment, the width of the signal electrode of the coplanar line on the repeating board being connected to the center conductor of the connector is smaller than the diameter of the center conductor.

As a twelfth embodiment of the optical module to solve the aforementioned problem, in the first, fourth or fifth embodiment, the signal electrode of the coplanar line on the repeating board being connected to the center conductor of the connector is lozenge-shaped having both a taper portion extending in the direction toward the connector and a tape portion narrowing toward the connector. Also each ground electrode being disposed on both sides of the signal electrode has a taper portion corresponding to the taper portion extending toward the connector.

As a thirteenth embodiment of the optical module to solve the aforementioned problem, in the first, fourth or fifth embodiment, the signal electrode width of the coplanar line is smaller than the diameter of the center conductor of the connector.

Further scopes and features of the present invention will become more apparent by the following description of the embodiments with the accompanied drawings.

DETAILED DESCRIPTION OF THE PREFERRED EMBODIMENTS

Figure 1:
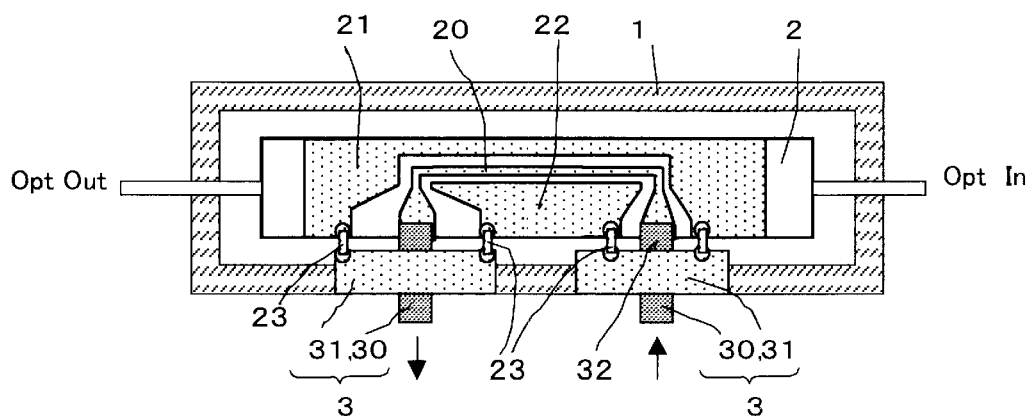
FIG. 1 shows a top plan view of a configuration example of an optical module for use as an optical modulator, when the cover of the optical module is removed.
Figures 2A, 2B, 2C:
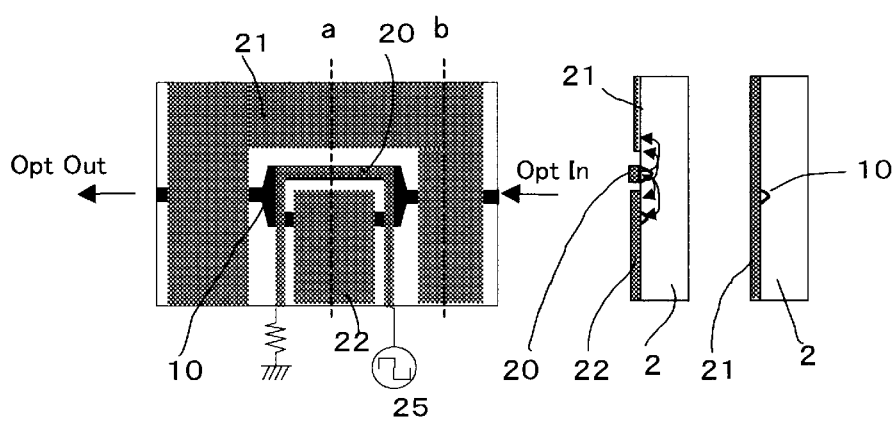
FIGS. 2A through 2C show schematic configuration diagrams of electro-optic effect element 2.

The preferred embodiments of the present invention are described hereinafter referring to the charts and drawings, wherein like numerals or symbols refer to like parts.

However, for the sake of easy understanding of the present invention, prior to the explanation of the embodiments of the present invention, there will be explained by referring to the accompanied drawings a method of connecting through a repeating board between signal electrode 20 and ground electrodes 21, 22 of electro-optic effect element 2 and center conductor 30 and outer conductor 31 of RF connector 3 provided in the optical module. Such an optical module has been studied by the inventors of the present invention.

Figure 3:
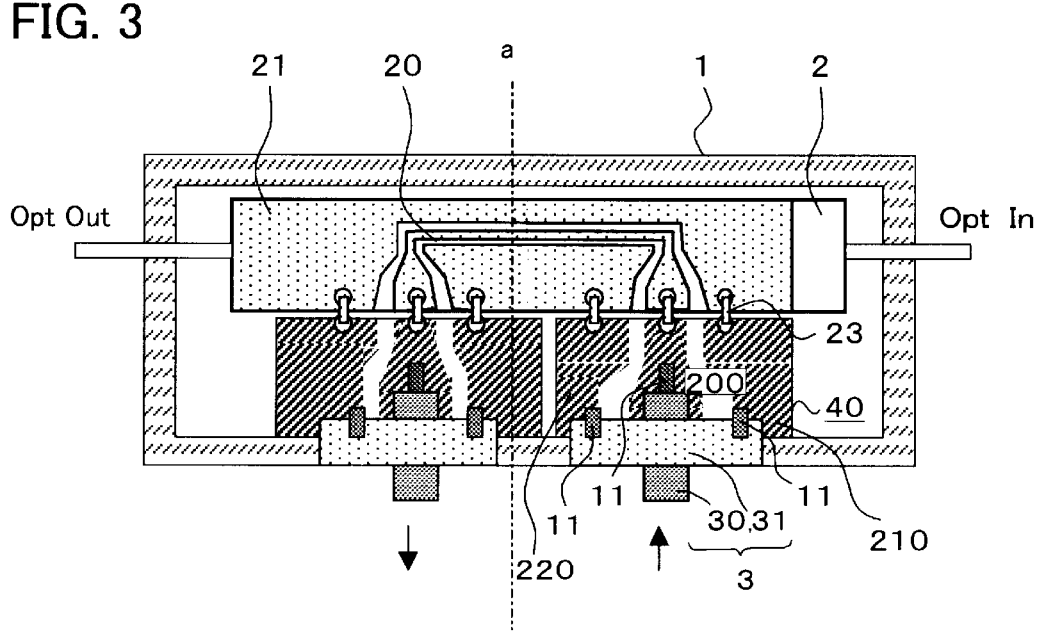
FIG. 3 shows a configuration example having been studied based on the idea by the inventors of the present invention.
Figure 4:
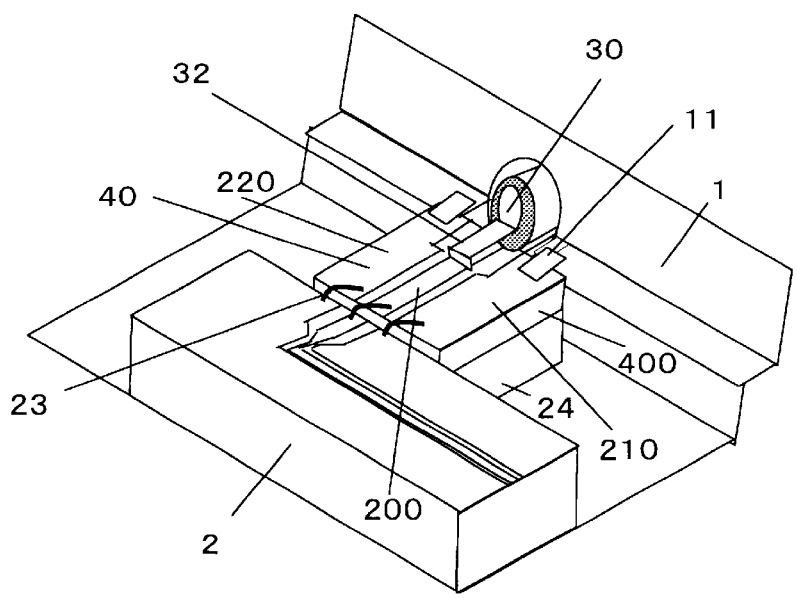
FIG. 4 shows a perspective view of the input side being cross-sectioned along section line a-b shown in FIG. 3.

FIG. 3 shows a configuration example of the optical module which has been studied under the concept derived by the inventors of the present invention, in which a top plan view when removing the cover of the optical module is shown in a similar manner to FIG. 1. FIG. 4 shows a perspective view of the input side cross-sectioned along line a-b shown in FIG. 3.

The relation of the input and the output is shown opposite to FIG. 1. However, the basic difference from the configuration shown in FIG. 1 is that a coplanar repeating board 40 is provided in the configuration shown in FIG. 3. Coplanar repeating board 40 has a wide electrode area having both a signal electrode 200 disposed in the center and ground electrodes 210, 220 disposed on both sides respectively corresponding to center conductor 30 and outer conductor 31 of RF connector 3.

Furthermore, coplanar repeating board 40 has the aforementioned signal electrode 200 and the ground electrodes 210, 220 disposed on both sides of the signal electrode on a dielectric wafer having permittivity smaller than the wafer material of electro-optic effect element 2, for example a ceramic wafer 400 obtained by firing an $AlO_3$ wafer. With such a configuration, characteristic impedance of the own coplanar repeating board 40 is designed to be, for example, 50 Ω similar to RF connector 3 and electro-optic effect element 2.

Figure 5:
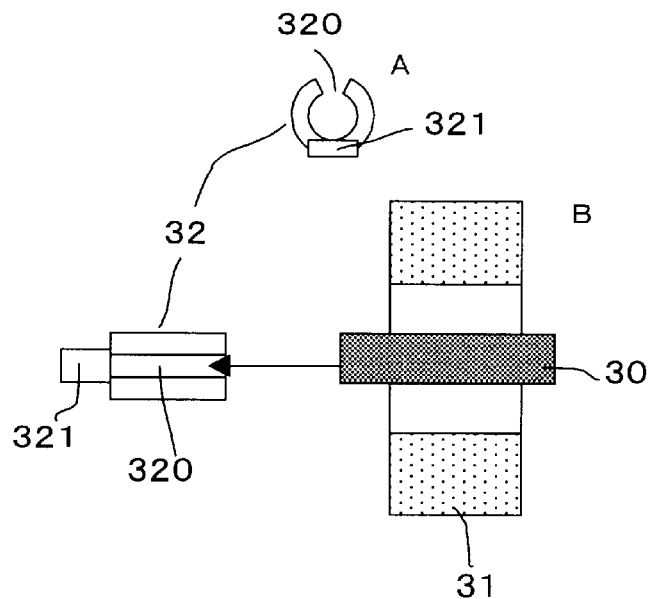
FIG. 5 shows an explanation drawing of sliding contact member 32.

Bonding wire 23 connects electrode 200 (210, 220) of coplanar repeating board 40 with electrode 20 (21, 23) of electro-optic effect element 2. Meanwhile, regarding connection between coplanar repeating board 40 and RF connector 3, a gold ribbon 11 is used for outer conductor 31, while a sliding contact member 32 is used for internal conductor 30 as shown in FIG. 5.

Figure 6:
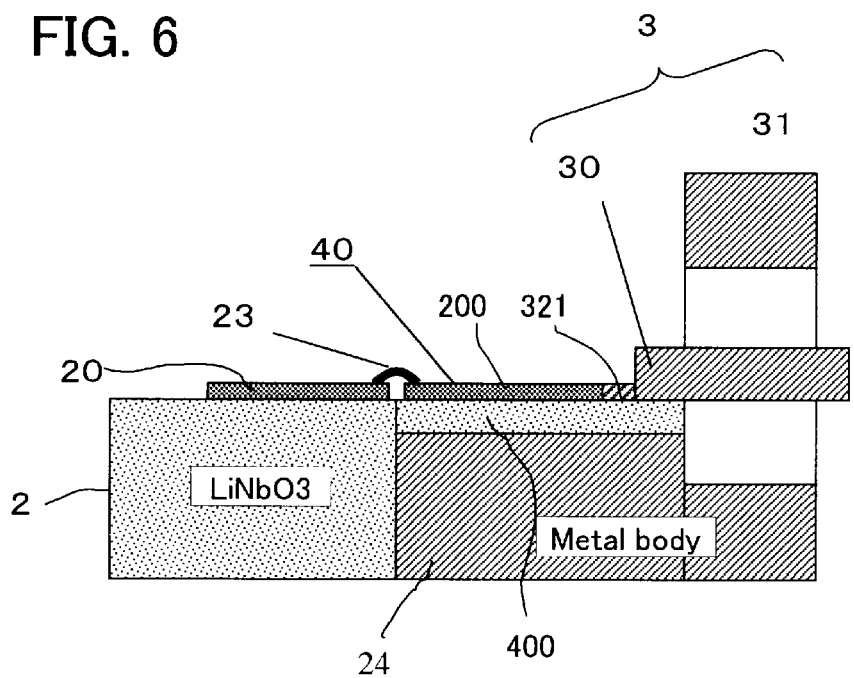
FIG. 6 shows a cross-sectional view of RF connector 3 along a center line of center conductor 30 of RF connector 3.

Sliding contact member 32 includes a ring having a slit 320 to which center conductor 30 is inserted, and a terrace 321 protruded from the ring. Accordingly, as shown in FIG. 6 illustrating a section from the center line of center conductor 30 in RF connector 3, terrace 321 is disposed in parallel with signal electrode 220 of coplanar repeating board 40 to abut thereto.

In addition, terrace 321 of sliding contact member 32 and a corresponding signal electrode 200 of coplanar repeating board 40 are connected with bonding.

Using such a configuration, assembly work becomes easier as compared to the work required for the conventional configuration shown in FIG. 1. However, it is to be noted that difference lies in the structures of connecting RF connector 3 with coplanar repeating board 40. Namely, the former has a co-axial structure while the latter has a coplanar structure. At the contact portion therebetween, there arises a problem of characteristic deterioration caused by turbulence in electromagnetic field, even when individual characteristic impedances are identical.

Figure 7A:
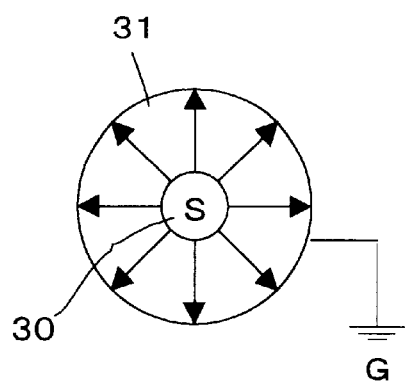
FIGS. 7A through 7C show explanation diagrams of a mode of an electric line of force.
Figure 7B:
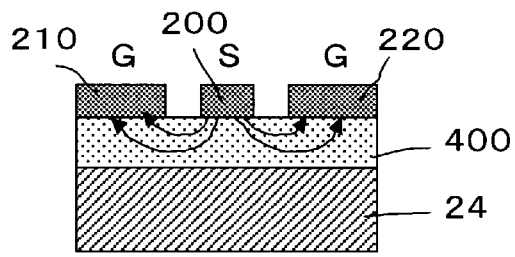

The above-mentioned problem will be explained in more detail referring to FIGS. 7A through 7C, which show diagrams illustrating modes of electric line of force. FIG. 7Ashows a mode of electric line of force for RF connector 3, in which the lines are directed from center conductor 30 to outer conductor 3 through a dielectric, or through air in case of being hollow. FIG. 7B shows a mode of electric line of force for coplanar repeating board 40. The lines are directed to ground electrodes 210, 220 on both sides from signal electrode 200 on a dielectric wafer, for example a ceramic wafer 400, placed on metal body 24 through ceramic wafer 400.

Accordingly, when considering characteristic impedance separately in RF connector 3 and coplanar repeating board 40, the electric line of force shown in FIG. 7 may be taken into consideration.

Here, the characteristic impedance $Z_0$ is represented by the following formula 1.

$$Z_0=\sqrt{[R^2+(1/j\omega C+j\omega L)^2]} \quad \text{formula 1}$$

where the above-mentioned capacity C is;

$C \propto \epsilon_r \cdot S/d$ (S: section area, and d: distance).

Now, the space between center conductor 30 and outer conductor 31 of RF connector 3 is assumed to be air. In the case of air, the relative permittivity $\epsilon_r$ is $\epsilon_{rair}=1$. In the meantime, in case coplanar repeating board 40 is constituted by a ceramic wafer obtained by firing $Al_2O_3$, the relative permittivity $\epsilon_r$ is equal to the relative permittivity of ceramic; $\epsilon_{rc}=5$ to 40.

Thus, the characteristic impedances of both RF connector 3 and coplanar repeating board 40 are specified using the corresponding relative permittivity.

However, as shown in the cross-section diagram in FIG. 6, when connecting RF connector 3 and coplanar repeating board 40, there is produced undesirable coupling on electric lines of force in the boundary area. Namely, electric lines of force couple center conductor 30 of RF connector 3 to ground conductors 210, 220 of coplanar repeating board 40, and also electric lines of force couple signal electrode 200 of coplanar repeating board 40 to outer conductor 31 of RF connector 3.

This produces large amount of characteristic impedance variation, bringing about increasing both radiation and reflection of the high frequency signal being input from RF connector 3. As a result, transmission loss increases in the optical device.

Accordingly, an object of the present invention is to study further to overcome the aforementioned problem, and to provide an optical module having a preferable connection structure to circumvent a loss which may be produced when supplying high frequency control signal externally through RF connector 3.

Figure 8:
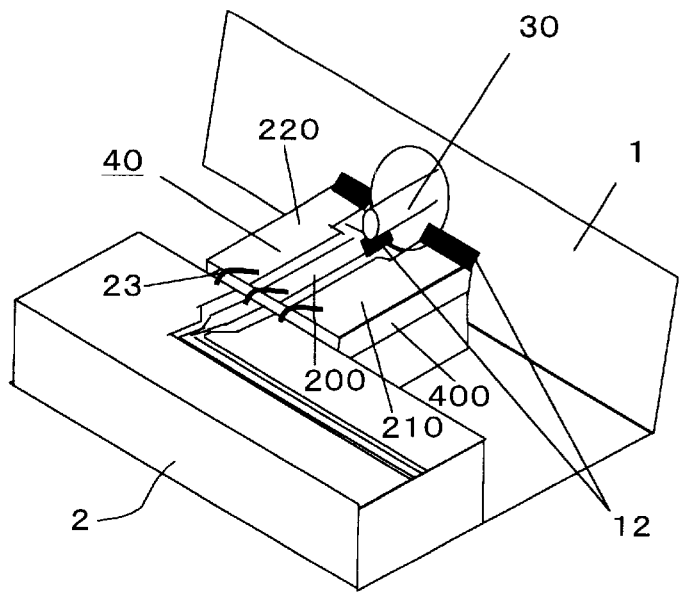
FIG. 8 shows a first embodiment of the present invention.
Figure 9:
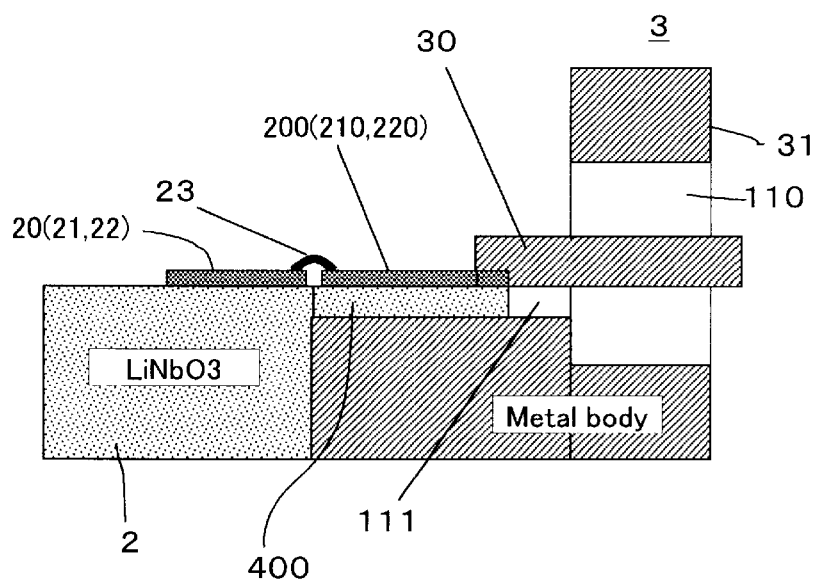
FIG. 9 shows a cross-sectional view of RF connector 3 along center conductor 30 thereof.

FIG. 8 shows a first embodiment of the present invention. In this configuration, between electro-optic effect element 2 and RF connector 3, there is provided coplanar repeating board 40 having been explained in relation to FIG. 4 as the object of study by the inventors of the present invention et al. FIG. 9 shows a cross-sectional view along center conductor 30 of RF connector 3, and FIG. 10 shows a top plan view illustrating the relation between RF connector 3 and coplanar repeating board 40.

In this embodiment, electrodes 200, 210, 220 produced in the film shape on a dielectric wafer 400, such as a ceramic wafer, of coplanar repeating board 40 are respectively connected to coplanar signal electrode 20 and ground electrodes 21, 22 of electro-optic effect element 2. Signal electrode 200 of coplanar repeating board 40 to be connected to signal electrode 20 is connected to center conductor 30 of RF connector 3 by, for example, a gold-tin brazing member 12.

Figure 10:
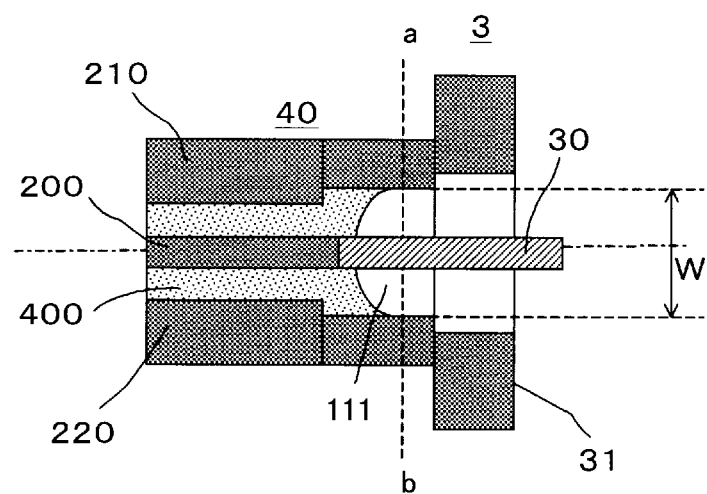
FIG. 10 shows a top plan view illustrating the relation between RF connector 3 and coplanar repeating board 40.

In this embodiment, a case that the diameter of outer conductor 31 of RF connector 3 is larger than interval W between the two ground electrodes 210, 220 is shown, as can be understood from the top plan view shown in FIG. 10.

Therefore, in this example, in the connection between RF connector 3 and coplanar repeating board 40, the coupling of electric line of force between center conductor 30 of RF connector 3 and ground conductors 210, 220 of coplanar repeating board 40 appears more strongly than the coupling of electric line of force between signal electrode 200 of coplanar repeating board 40 and outer conductor 31 of RF connector 3.

For this reason, in the first embodiments of the present invention shown in FIGS. 8–10, in case of connecting RF connector 3 and coplanar repeating board 40, it is structured not to couple electric line of force between center conductor 30 of RF connector 3 and ground conductors 210, 220 of coplanar repeating board 40. More specifically, on the lower part of coplanar repeating board 40 on which center conductor 30 of RF connector 3 is disposed, a notch 111 is produced at the side faces of coplanar repeating board 40 being positioned oppositely to the aforementioned RF connector 3. As shown in FIGS. 9 and 10, this notch 111 produces an air layer being connected to air layer 110 situated between center conductor 30 and outer conductor 31 in RF connector 3.

The air layer thus produced at notch 111 extends the electric distance between center conductor 30 of RF connector 3 and ground conductors 210, 220 of coplanar repeating board 40. As a result it becomes possible to weaken the coupling of electric line of force therebetween.

In the mean time, according to the embodiment, the diameter of outer conductor 31 of RF connector 3 is larger than the interval width between ground electrodes 210, 220 of coplanar repeating board 40. Therefore, the influence caused by the coupling of electric line of force between signal electrode 200 of coplanar repeating board 40 and outer conductor 31 of RF connector 3 is inherently small.

Accordingly, in the first embodiment of the present invention, in the connection between RF connector 3 and coplanar repeating board 40, it becomes possible to reduce large characteristic impedance variation.

Figure 11:
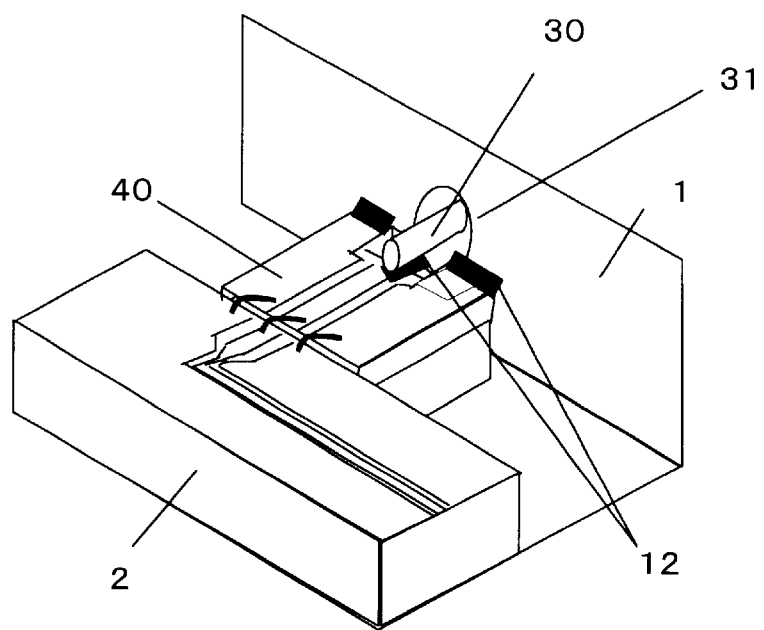
FIG. 11 shows a second embodiment of the present invention.
Figure 12:
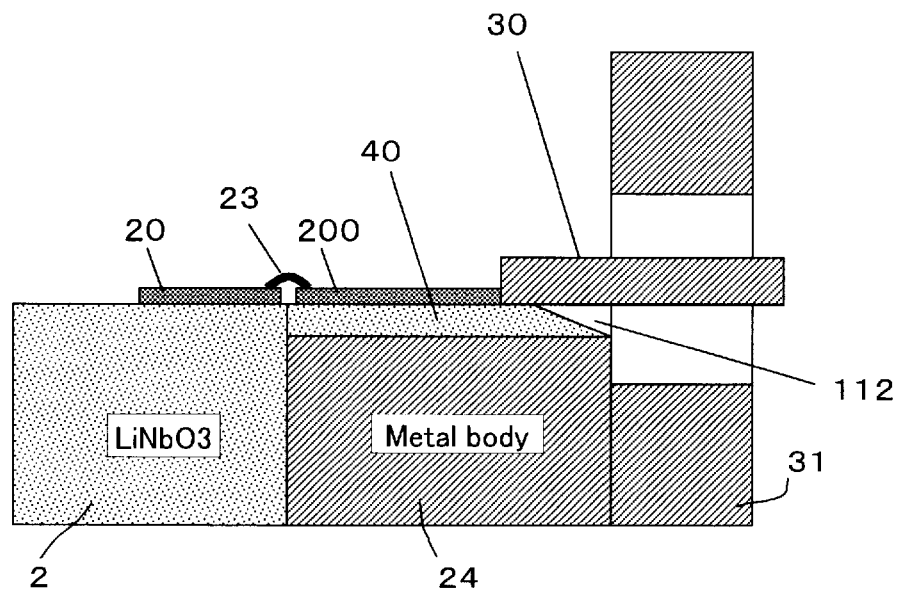
FIG. 12 shows a cross-sectional view of RF connector 3 along center conductor 30 thereof.
Figure 13:
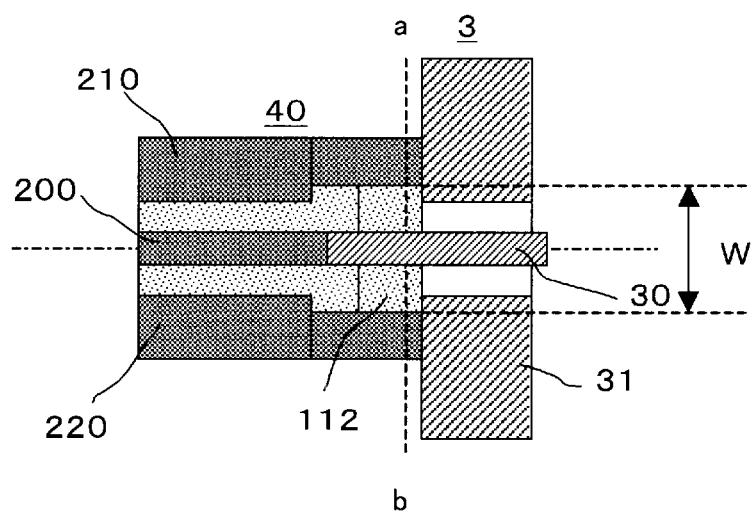
FIG. 13 shows a top plan view illustrating the relation between RF connector 3 and coplanar repeating board 40.
Figure 14:
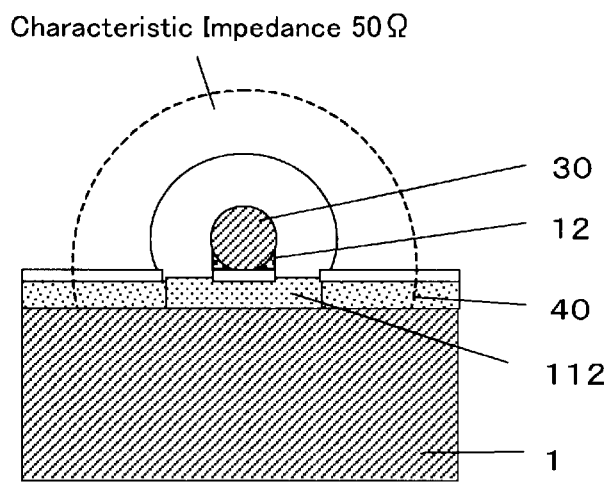
FIG. 14 shows a cross-sectional view along line a b shown in FIG. 13, observed from the RF connector 3 side.

FIG. 11 shows a second embodiment of the present invention. Between electro-optic effect element 2 and RF connector 3 in this configuration, there is disposed coplanar repeating board 40 which has been explained in relation to FIG. 4 as the object of study by the inventors of the present invention, et al. FIG. 12 shows a cross-sectional view along center conductor 30 of RF connector 3. Also, FIG. 13 shows a top plan view illustrating the relation between RF connector 3 and coplanar repeating board 40. Moreover, FIG. 14 shows a cross-sectional view along line a-b shown in FIG. 13, which is observed from the RF connector 3 side.

Also in this embodiment, electrodes 200, 210, 220 produced in the film shape on dielectric wafer 400, such as a ceramic wafer, of coplanar repeating board 40 are respectively connected to signal electrode 20 and ground electrodes 21, 22 of electro-optic effect element 2. Signal electrode 200 of coplanar repeating board 40 to be connected to signal electrode 20 is connected to center conductor 30 of RF connector 3 by, for example, gold-tin brazing member 12.

In this embodiment, there is shown a case that the diameter of outer conductor 31 of RF connector 3 is smaller than interval W between the two ground electrodes 210, 220, as can be seen in the top plan view shown in FIG. 13.

Therefore, in this example, the electric distance between signal electrode 200 of coplanar repeating board 40 and outer conductor 31 of RF connector 3 becomes shorter, resulting in stronger coupling of electric line of force therebetween. In addition, the coupling of electric line of force between center conductor 30 of RF connector 3 and ground electrodes 210, 220 of coplanar repeating board 40 is the same as in the first embodiment mentioned earlier.

In this second embodiment, the lower portion of coplanar repeating board 40 on which center conductor 30 of RF connector 3 is disposed is chamfered in the taper shape to produce an air layer 112. Accordingly, in the cross-sectional view along center conductor 30 of RF connector 3 shown in FIG. 12, air layer 112 is illustrated in the triangle shape.

By this air layer 112 produced by chamfering in the triangle shape, the electric distance between signal electrode 200 of coplanar repeating board 40 and outer conductor 31 of RF connector 3 becomes farther. Also, the electric distance between center conductor 30 of RF connector 3 and ground electrodes 210, 220 disposed on coplanar repeating board 40 becomes farther by air layer 112 laid therebetween.

Thus it becomes possible to reduce electric coupling between center conductor 30 of RF connector 3 and coplanar repeating board 40, enabling to circumvent large variation of characteristic impedance in the connection between coplanar repeating board 40 and RF connector 3.

Figure 15:
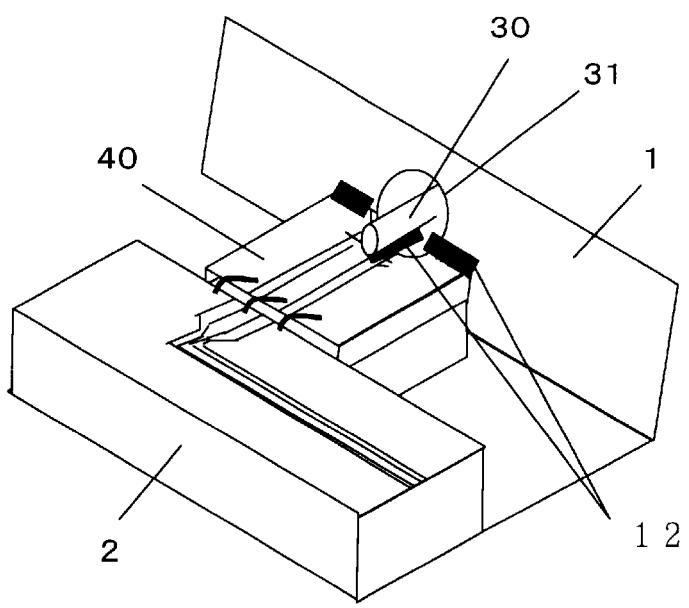
FIG. 15 shows a diagram illustrating a third embodiment of the present invention.
Figure 16:
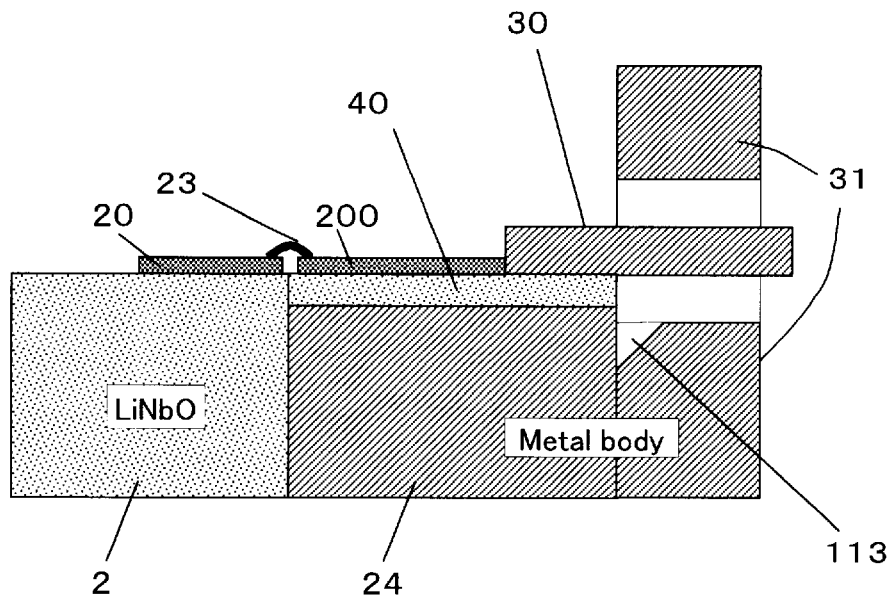
FIG. 16 shows a cross-sectional view of RF connector 3 along center conductor 30 thereof.

FIG. 15 shows a third embodiment of the present invention. In this configuration, between electro-optic effect element 2 and RF connector 3, there is disposed coplanar repeating board 40 as the object of study by the inventors of the present invention, etc. having been explained in relation to FIG. 4. FIG. 16 shows a cross-sectional view along center conductor 30 of RF connector 3. Also, FIG. 17 shows a top plan view illustrating the relation between RF connector 3 and coplanar repeating board 40.

In this embodiment also, electrodes 200, 210, 220 produced in the film shape on dielectric wafer 400, such as a ceramic wafer, of coplanar repeating board 40 are respectively connected to signal electrode 20 and ground electrodes 21, 22 of electro-optic effect element 2. Signal electrode 200 of coplanar repeating board 40 to be connected to signal electrode 20 is connected to center conductor 30 of RF connector 3 by, for example, gold-tin brazing member 12.

Figure 17:
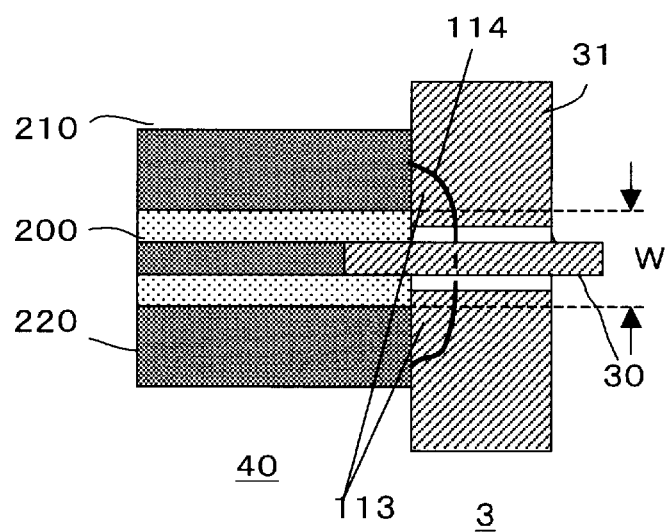
FIG. 17 shows a top plan view illustrating the relation between RF connector 3 and coplanar repeating board 40.

Further, in this embodiment, there is shown a case that the diameter of outer conductor 31 of RF connector 3 is relatively smaller than interval W between the two ground electrodes 210, 220, as can be seen in the top plan view shown in FIG. 17.

Accordingly, in this third embodiment, the electric distance between signal electrode 200 of coplanar repeating board 40 and outer conductor 31 of RF connector 3 becomes shorter, to increase the coupling ratio of electric line of force. Therefore, the diameter of outer conductor 31 of RF connector 3 is expanded by chamfering the area of outer conductor 31 being positioned oppositely to coplanar repeating board 40.

This portion of outer conductor 31 the diameter of which is expanded by chamfering is shown in FIG. 16 as a triangle-shaped section, and is also shown in FIG. 17 as a notched line 114. Similar to the preceding embodiment, air layer 113 is produced by chamfering external electrode 31, enabling the electric distance between signal electrode 200 of coplanar repeating board 40 and outer conductor 31 of RF connector 3 farther.

Figure 7C:
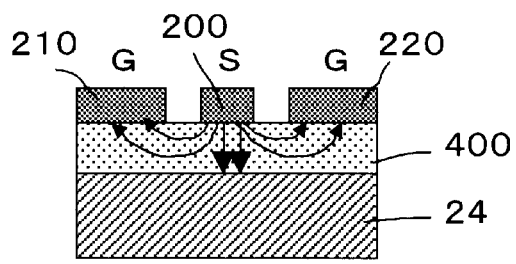

Now, a mode of electric line of force is reconsidered referring to FIGS. 7A through 7C. In FIG. 7B, the electric lines of force are entirely coupled between signal electrode 200 and ground electrodes 210, 220 in dielectric wafer 400.

Dielectric wafer 400 has approximately 1 mm in thickness and is disposed on metal body 24 having a ground potential common to shielding case 1. Therefore, when the signal level flowing through signal electrode 200 is sufficiently large, the electric line of force is coupled even between signal electrode 200 and metal body 24 as shown in FIG. 7C.

In such a case, center conductor 30 of RF connector 3 has large impedance in the area connected to coplanar repeating board 40, resulting in producing loss in high-frequency signal supplied from RF connector 3.

Figure 18:
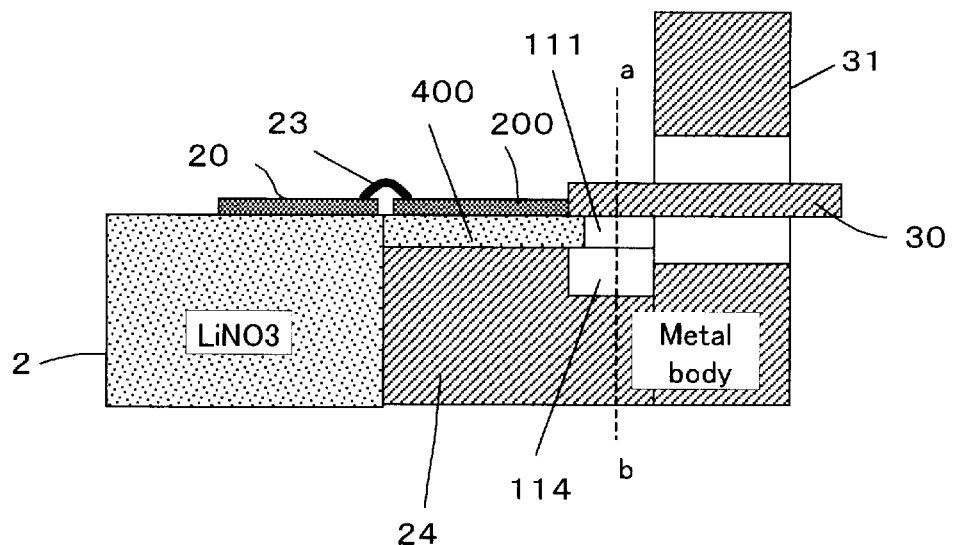
FIG. 18 shows a cross-sectional view of RF connector 3 along center conductor 30 thereof in an embodiment for circumventing a problem that electric-line of force between signal electrode 200 and a metal body 24 are connected as shown in FIG. 7C.
Figure 19:
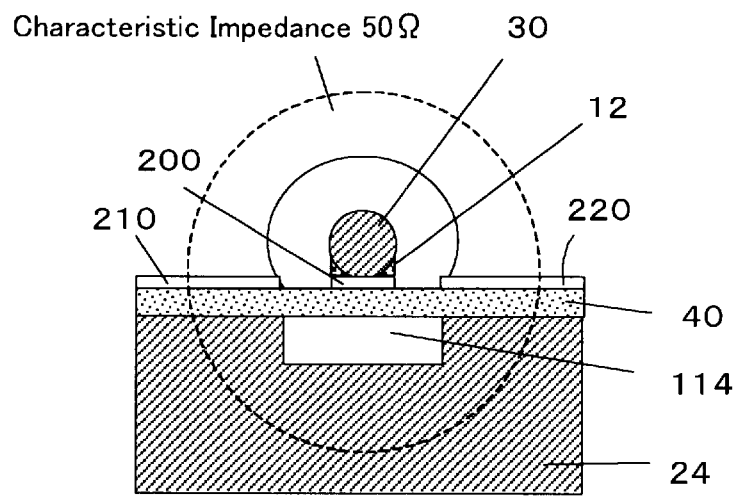
FIG. 19 shows a cross-sectional view along line a b shown in FIG. 18 observed to the direction of RF connector 3.

FIGS. 18, 19 show the embodiments to circumvent the aforementioned problem. FIG. 18 shows a cross-sectional view of RF connector 3 along center conductor 30. Also, FIG. 19 shows a cross-sectional view of RF connector 3 along line a-b shown in FIG. 18 when viewed in the direction toward RF connector 3.

A feature is that a notched portion 114 is provided on metal body 24 at the area corresponding to center conductor 30 on coplanar repeating board 40 of RF connector 3 so as to form an air layer. This extends the electric distance between signal electrode 200 of coplanar repeating board 40 and metal body 24, resulting in eliminating such electric line of force as shown in FIG. 7C. In the section shown in FIG. 19, the characteristic impedance can be set integrally using the area of center conductor 30 of RF connector 3 connected to coplanar repeating board 40.

Additionally, in the example shown in FIG. 18, there has been illustrated a diagram based on the aforementioned first embodiment. However, needless to say, the method is also applicable to the second and third embodiments mentioned earlier.

Figure 20:
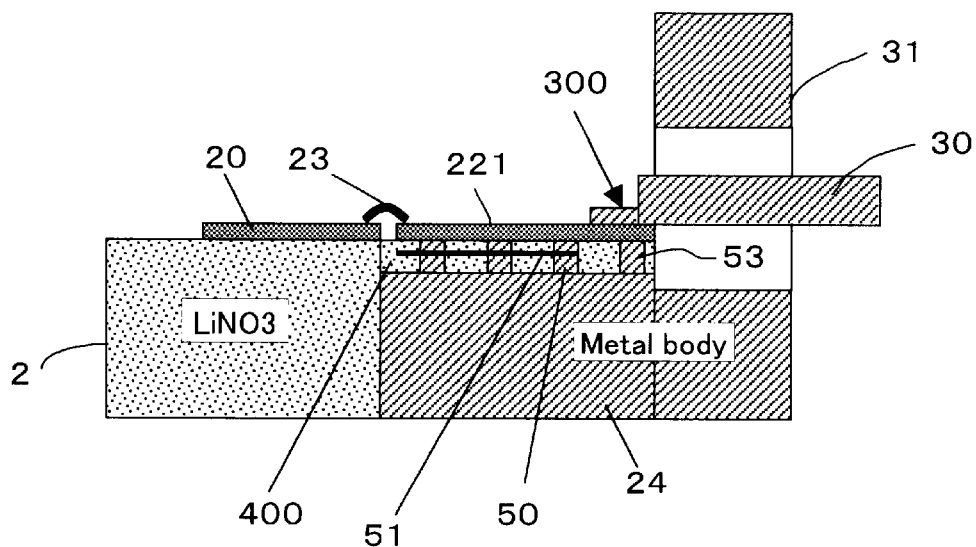
FIG. 20 shows another embodiment of the present invention.
Figure 21:
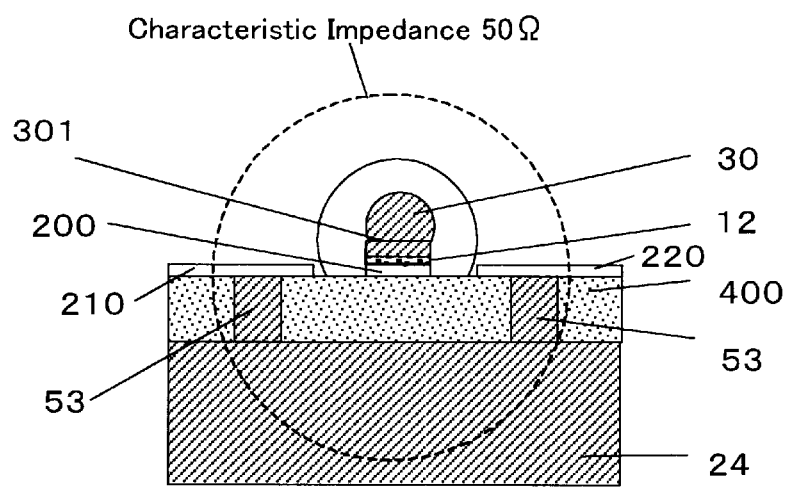
FIG. 21 shows a cross sectional view of the embodiment shown in FIG. 20.

Now, FIGS. 20, 21 are still another embodiments of the present invention. This method is also applicable to any aforementioned embodiments.

As having been illustrated in FIG. 7B, in the coplanar line on coplanar repeating board 40 having both signal electrode 200 and ground electrodes 210, 220, the electric line of force couples between signal electrode 200 and ground electrodes 210, 220. Accordingly, in case of only ground electrodes 210, 220, the potential thereof floats from the ground GND, which may possibly cause loss of mutual balance.

A configuration to cope with this problem is shown in the embodiment shown in FIG. 20. FIG. 21 shows a cross-sectional view of the configuration example shown in FIG. 20. In FIGS. 20, 21 a plurality of VIA 50 are produced on dielectric wafer 400 of metal body 24.

Further, dielectric wafer 400 consists of a multi-layer having an internal conductor 51 in the intermediate layer. The plurality of VIA 50 are mutually connected by this internal conductor 51. Moreover, internal conductor 51 is connected to metal body 24 through VIA 50, to fix the potential rigidly to the ground GND. Thus it becomes possible to maintain the potential balance of ground electrodes 210, 220 throughout the electrodes.

FIG. 21 shows a cross-sectional view of the embodiment shown in FIG. 20 in the direction from the RF connector 3 side toward the coplanar repeating board 40 side. Here, a VIA 53 located near center conductor 30 of RF connector 3 is neither connected to internal conductor 51 nor metal body 24.

The reason for this configuration is to prevent the coupling of electric line of force between center conductor 30 and ground electrodes 210, 220. Another reason is that in the manufacturing process of dielectric wafer 400, VIA 53 is manufactured commonly to other VIA 50 to utilize for adjusting overall impedance in the connection of RF connector 3 with coplanar repeating board 40. In such a way, the characteristic impedance can integrally be set by the area of center conductor 30 of RF connector 3 being connected to coplanar repeating board 40.

Additionally, instead of providing the plurality of VIA 50 as shown in FIG. 20, it is also possible to connect the surface plane side of coplanar repeating board 40 with ground electrodes 210, 220 using a non-illustrated flying wire to fix to the common ground potential.

Next, a preferred electrode shape of signal electrode 200 of coplanar repeating board 40 for each embodiment will be studied hereinafter.

Figure 22:
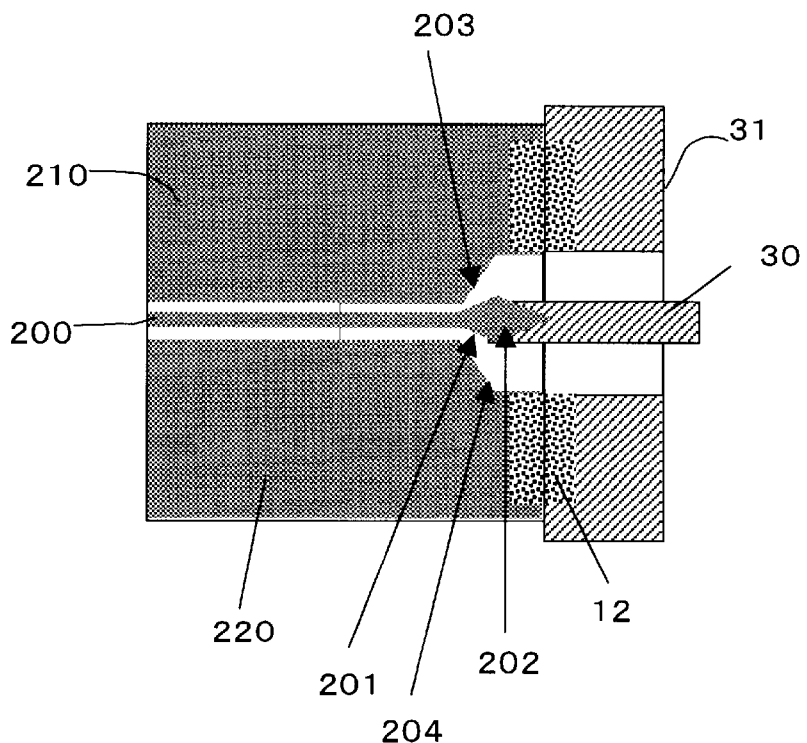
FIG. 22 shows a diagram illustrating signal electrode shapes having a feature in the shapes of the top end of signal electrode 200 of the RF connector 3 side and ground electrodes 210, 220 respectively provided on planar repeating board 40.

In the electrode shown in FIG. 22, a feature lies in the shape of an end portion of signal electrode 200 on the RF connector 3 side of coplanar repeating board 40, as well as in the shape of ground electrodes 210, 220.

More specifically, the end portion of the signal electrode 200 of coplanar repeating board 40 on the RF connector 3 side is lozenge-shaped, which is constituted by a taper portion extending toward RF connector 3 (refer to 201 in FIG. 18) and a taper portion narrowing toward RF connector 3 (refer to 202 in FIG. 18). Further, in ground electrodes 210, 220, there is provided a taper portion (refer to 203, 204 in FIG. 18) corresponding to the taper portion in signal electrode 200 the top portion of which extends.

By such shape of signal electrode 200 and ground electrodes 210, 220 disposed on coplanar repeating board 40, the distance between signal electrode 200 of coplanar repeating board 40 and center conductor 30 of RF connector 3 can be shortened. Accordingly, mutual coupling of electric line of force can be weakened.

Figure 23:
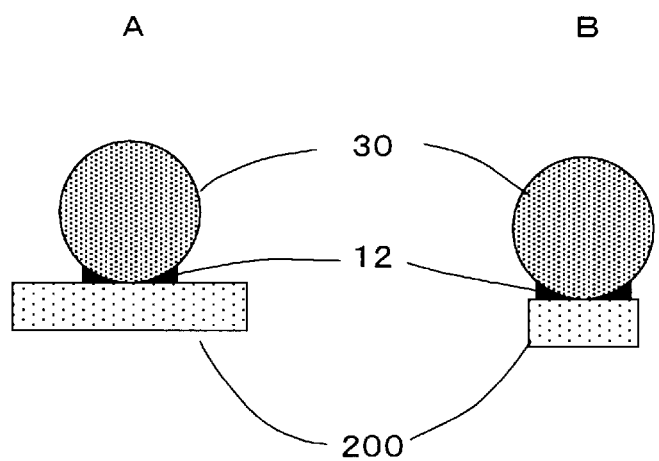
FIG. 23 shows a diagram for studying on the width of main signal electrode 200 on coplanar repeating board 40 to which center conductor 30 of RF connector 3 is connected.

FIG. 23 shows a diagram for considering the width of main signal electrode 200 of coplanar repeating board 40 being connected to center conductor 30 of RF connector 3. As having been explained earlier in FIG. 7, the mode of electric line of force on the coplanar line is as shown in FIG. 7B. As shown in FIG. 7C, in order not to couple electric lines of force against metal body 24, it is necessary to increase the density of electric line of force which couples signal electrode 200 to the ground electrodes.

For this purpose, it is more advantageous to produce the width of signal electrode 200 narrower than the diameter of center conductor 30 as shown in FIG. 23B, as compared to produce signal electrode 200 wider than the diameter of center conductor 30 as shown in FIG. 23A. Here, signal electrode 200 is connected to center conductor 30 by means of brazing member 12 on the side face of center conductor 30. When the width of signal electrode 200 is narrow, the connection using brazing member 12 is assumed difficult.

In such a case, as shown in FIG. 21, it is desirable to form center conductor 30 to be connected to signal electrode 200 in the thin shape (refer to 301 in FIG. 21) to connect to signal electrode 200 with brazing member 12.

In the foregoing embodiments of the present invention, there has been explained a modulator using electro-optic effect element 2 in an optical module. However, the description is not intended to limit the invention to apply to the illustrated examples. In addition, in the foregoing examples, the modulator is illustrated taking examples of a Z-cut dielectric wafer, a single electrode and the intensity modulation scheme. However, the present invention is not limited to the above-mentioned modulator.

Namely, as other types of the modulator, it is also possible to provide dual electrodes on a Z-cut dielectric wafer with the intensity modulation scheme. Further, as a modulation scheme, it is also possible to apply either a phase modulation scheme or a polarization modulation scheme. When using an X-cut dielectric wafer, the same combination of electrode configuration and modulation scheme is applicable.

As can be understood from the illustrated embodiments of the present invention, it becomes possible to supply a high-frequency control signal to an electro-optic effect element in an optical module through an external RF cable and an RF connector without producing the coupling of electric line of force directly between an outer conductor of the RF connector and a signal electrode of a coplanar repeating board.

Thus, a wideband frequency characteristic can be obtained in the optical module.

As mentioned earlier, the foregoing description of the embodiments is not intended to limit the invention to the particular details of the examples illustrated. Any suitable modification and equivalents may be resorted to the scope of the invention. All features and advantages of the invention, which fall within the scope of the invention are covered by the appended claims.

What is claimed is:

1. An optical module having an element mounted thereupon for shifting an optical phase by an electro-optic effect, the optical module comprising:

an element shifting an optical phase by an electro-optic effect having a signal electrode and a ground electrode formed thereupon;

a connector supplying a control signal of a microwave region to the signal electrode of the element, having a center conductor and an outer conductor; and a repeating board formed on a dielectric wafer having coplanar lines connecting the signal electrode and the ground electrode of the element with the center conductor and the outer conductor of the connector, respectively, wherein an air layer is formed on the lower portion of the repeating board on which the center conductor of the connector is disposed.

2. The optical module having the element for shifting an optical phase by the electro-optic effect according to claim 1, wherein the width of the signal electrode of the coplanar line on the repeating board being connected to the center conductor of the connector is smaller than the diameter of the center conductor.

3. The optical module having the element for shifting an optical phase by the electro-optic effect according to claim 1, wherein the signal electrode width of the coplanar line is smaller than the diameter of the center conductor of the connector.

4. An optical module having an element mounted thereupon for shifting an optical phase by the electro-optic effect, the optical module comprising:

an element for shifting an optical phase by an electro-optic effect having a signal electrode and a ground electrode formed thereupon;

a connector for supplying a control signal of a microwave region to the signal electrode of the element, having a center conductor and an outer conductor; and a repeating board formed on a dielectric wafer having the signal electrode and the ground electrode of the element and coplanar lines for connecting the center conductor of the connector with the outer conductor respectively formed on the dielectric wafer, wherein an air layer is formed on the lower portion of the repeating board on which the center conductor of the connector is disposed and is formed by a notch produced on the side face of the dielectric wafer positioned oppositely to the connector.

5. The optical module having the element for shifting an optical phase by the electro-optic effect according to claim 4, wherein the coplanar line is constituted by a signal electrode and ground electrodes disposed on both sides of the signal electrode, and the interval between the ground electrodes is smaller than the diameter of the outer conductor of the connector.

6. An optical module having an element mounted thereupon for shifting an optical phase by the electro-optic effect, the optical module comprising:

an element for shifting an optical phase produced by an electro-optic effect, having a signal electrode and a ground electrode formed thereupon;

a connector for supplying a control signal of a microwave region to the signal electrode of the element, having a center conductor and an outer conductor; and a repeating board formed on a dielectric wafer having the signal electrode and the ground electrode of the element and a coplanar line for connecting the center conductor of the connector with the outer conductor respectively formed on the dielectric wafer, the outer conductor of the connector having an extended diameter in the area positioned oppositely to the repeating board.

7. The optical module having the element for shifting an optical phase by the electro-optic effect according to claim 6, wherein the coplanar line is constituted by a signal electrode and ground electrodes disposed between both sides of the signal electrode, and the interval between the ground electrodes is larger than the diameter of the outer conductor of the connector.

8. The optical module having the element for shifting an optical phase by the electro-optic effect according to claim 6, wherein the width of the signal electrode of said coplanar line on the repeating board being connected to the center conductor of the connector is smaller than the diameter of the center conductor.

9. The optical module having the element for shifting an optical phase by the electro-optic effect according to claim 6, wherein the signal electrode of said coplanar line on the repeating board being connected to the center conductor of the connector is lozenge-shaped having both a taper portion extending in the direction toward the connector and a tape portion narrowing toward the connector, and the each ground electrode being disposed on both sides of the signal electrode has a taper portion corresponding to the taper portion extending toward the connector.

10. The optical module having the element for shifting an optical phase by the electro-optic effect according to claim 6, wherein the signal electrode width of the coplanar line is smaller than the diameter of the center conductor of the connector.

11. An optical module having an element mounted thereupon for shifting an optical phase by the electro-optic effect, the optical module comprising:

an element for shifting an optical phase by an electro-optic effect having a signal electrode and a ground electrode formed thereupon;

a connector for supplying a control signal of a microwave region to the signal electrode of the element, having a center conductor and an outer conductor; and a repeating board formed on a dielectric wafer having the signal electrode and the ground electrode of the element and a coplanar line for connecting the center conductor of the connector with the outer conductor respectively formed on the dielectric wafer, wherein the lower portion of the repeating board on which the center conductor of the connector is disposed is chamfered in a taper shape to form an air layer.

12. The optical module having the element for shifting an optical phase by the electro-optic effect according to claim 11, wherein the width of the signal electrode of said coplanar line on the repeating board being connected to the center conductor of the connector is smaller than the diameter of the center conductor.

13. The optical module having the element for shifting an optical phase by the electro-optic effect according to claim 11, wherein the signal electrode of said coplanar line on the repeating board being connected to the center conductor of the connector is lozenge-shaped having both a taper portion extending in the direction toward the connector and a tape portion narrowing toward the connector, and the each ground electrode being disposed on both sides of the signal electrode has a taper portion corresponding to the taper portion extending toward the connector.

14. The optical module having the element for shifting an optical phase by the electro-optic effect according to claim 11, wherein the signal electrode width of the coplanar line is smaller than the diameter of the center conductor of the connector.

15. The optical module having the element for shifting an optical phase by the electro-optic effect according to claim 11, wherein the coplanar line is constituted by a signal electrode and ground electrodes disposed between both sides of the signal electrode, and the interval between the ground electrodes is larger than the diameter of the outer conductor of the connector.

16. An optical module having an element mounted thereupon shifting an optical phase by an electro-optic effect, the optical module comprising:

an element shifting the optical phase by the electro-optic effect having a signal electrode and a ground electrode formed thereupon;

a connector supplying a control signal of a microwave region to the signal electrode of the element, having a center conductor and an outer conductor;

a repeating board formed on a dielectric wafer having coplanar lines connecting the signal electrode and the ground electrode of the element with the center conductor and the outer conductor of the connector, respectively; and a metal body for mounting the dielectric wafer for the repeating board, wherein an air layer is formed on the metal body portion corresponding to the lower portion of the repeating board on which the center conductor of the connector is disposed.

17. An optical module having an element mounted thereupon shifting an optical phase by an electro-optic effect, the optical module comprising:

an element shifting an optical phase by the electro-optic effect having a signal electrode and a ground electrode formed thereupon;

a connector supplying a control signal of a microwave region to the signal electrode of the element, having a center conductor and an outer conductor;

a repeating board formed on a dielectric wafer having the coplanar lines connecting the signal electrode and the ground electrode of the element with the center conductor and the outer conductor; and a metal body for mounting the repeating board formed on the dielectric wafer, wherein the dielectric wafer for the repeating board is electrically connected to the metal body through a plurality of plated through-holes.

18. The optical module having the element shifting the optical phase by the electro-optic effect according to claim 17, wherein the dielectric wafer is constituted of multi-layer structure having an internal conductor in the middle layer to connect the plurality of plated through-holes by the internal conductor.

19. The optical module having the element shifting the optical phase by the electro-optic effect according to claim 18, wherein among the plurality of plated through-holes, a plated through-hole of the repeating board positioned in the area in which the center conductor of the connector is disposed is not connected to the internal conductor.

20. An optical module having an element mounted thereupon for shifting an optical phase by the electro-optic effect, the optical module comprising:
- an element for shifting an optical phase by an electro-optic effect having a signal electrode and a ground electrode formed thereupon;
- a connector for supplying a control signal of a microwave region to the signal electrode of the element, having a center conductor and an outer conductor; and
- a repeating board formed on a dielectric wafer having the signal electrode and the ground electrode of the element and coplanar lines for connecting the center conductor of the connector with the outer conductor respectively formed on the dielectric wafer,
- wherein
  - an air layer is formed on the lower portion of the repeating board on which the center conductor of the connector is disposed,
  - the signal electrode of the coplanar line on the repeating board being connected to the center conductor of the connector is lozenge-shaped having both a taper portion extending in the direction toward the connector and a tape portion narrowing toward the connector, and
  - the each ground electrode being disposed on both sides of the signal electrode has a taper portion corresponding to the taper portion extending toward the connector.

21. An optical module having an element mounted thereupon shifting an optical phase by an electro-optic effect, the optical module comprising:
- an element shifting an optical phase produced by the electro-optic effect, having a signal electrode and a ground electrode formed thereupon;
- a connector supplying a control signal of a microwave region to the signal electrode of the element, having a center conductor and an outer conductor; and
- a repeating board formed on a dielectric wafer having coplanar lines connecting the signal electrode and the ground electrode of the element with the center conductor and the outer conductor of the connector, respectively,
- the outer conductor of the connector having an extended diameter in the area positioned oppositely to the repeating board.

22. An optical module having an element mounted thereupon for shifting an optical phase by an electro-optic effect, the optical module comprising: an element for shifting an optical phase by an electro-optic effect having a signal electrode and a ground electrode formed thereupon;
- a connector for supplying a control signal of a microwave region to the signal electrode of the element, having a center conductor and an outer conductor; and
- a repeating board formed on a dielectric wafer having coplanar lines for connecting the signal electrode and the ground electrode of the element with the center conductor and the outer conductor of the connector, respectively,
- wherein the lower portion of the repeating board on which the center conductor of the connector is disposed is chamfered in a taper shape to form an air layer.

* * * * *

UNITED STATES PATENT AND TRADEMARK OFFICE
CERTIFICATE OF CORRECTION

PATENT NO.    : 6,741,379 B2
DATED         : May 25, 2004
INVENTOR(S)   : Yoshihiko Kaitoh et al.

It is certified that error appears in the above-identified patent and that said Letters Patent is hereby corrected as shown below:

Title page,
Item [56], References Cited, U.S. PATENT DOCUMENTS, before "5,991,491" please insert -- 5,138,480 8/1992 Dolfi et al. --
FOREIGN PATENT DOCUMENTS, please insert
-- JP 6-130338  5/1994
    EP 6/2001  1 109 050 --.

Signed and Sealed this

Twenty-eighth Day of December, 2004

JON W. DUDAS
*Director of the United States Patent and Trademark Office*